Feb. 27, 1973 R. E. MYERS 3,718,146

DENTAL FLOSS HOLDER

Filed March 8, 1972

United States Patent Office 3,718,146
Patented Feb. 27, 1973

3,718,146
DENTAL FLOSS HOLDER
Robert E. Myers, 18506 Prince William Lane,
Houston, Tex. 77058
Filed Mar. 8, 1972, Ser. No. 232,707
Int. Cl. A61c 15/00
U.S. Cl. 132—92          7 Claims

ABSTRACT OF THE DISCLOSURE

A casing with an open-ended tapered bore is slidable on an elongated tapered handle to a locked or wedged position. A supply of floss in the casing extends through the bore in one direction, then across an open recess in the tapered end portion of the handle, and then in the other direction through the bore, so that portions of floss in the bore may be wedgingly locked against the handle to retain the floss tightly stretched across the recess, when the casing is slid to its locked position. The casing contains a rotatable spool on which the floss supply is carried.

---

This invention relates to new and useful improvements in dental floss holders, and in particular the invention concerns itself with an improved device which contains a supply of floss and by which the floss may be easily and conveniently manipulated for teeth cleaning purposes.

As is well known, a simple length of floss is difficult to hold and manipulate, especially by small children, since it has a tendency to slide through the fingers and, even at best, is very awkward to hold with fingers in near proximity to the teeth. Thus, the prior art has developed a large variety of devices for holding and manipulating floss and, for most part, such prior art devices fulfill their primary intended purpose. However, in many instances they possess certain inherent disadvantages, as for example in difficulty of threading or training the floss through or over the implement, and/or complex arrangements for locking the floss in a tightly stretched condition for use.

It is, therefore, the principal object of this invention to provide a very simple but highly effective device which contains a supply of floss, capable of being easily withdrawn as required and stretched tightly in position for use, in which position the floss is positively locked by a simple locking movement and so remains until an additional, fresh length of floss is needed.

Conveniently, the floss holder of the invention may be embodied in and on the handle of a conventional toothbrush, so that it is readily available for tooth cleaning purposes.

The invention is simple in construction, efficient and dependable in operation, and lends itself to economical manufacture.

With the foregoing more important object and features in view and such other objects and features which may become apparent as this specification proceeds, the invention will be understood from the following description taken in conjunciton with the accompanying drawings, in which like characters of reference designate like parts, and in which.

Figure 1:
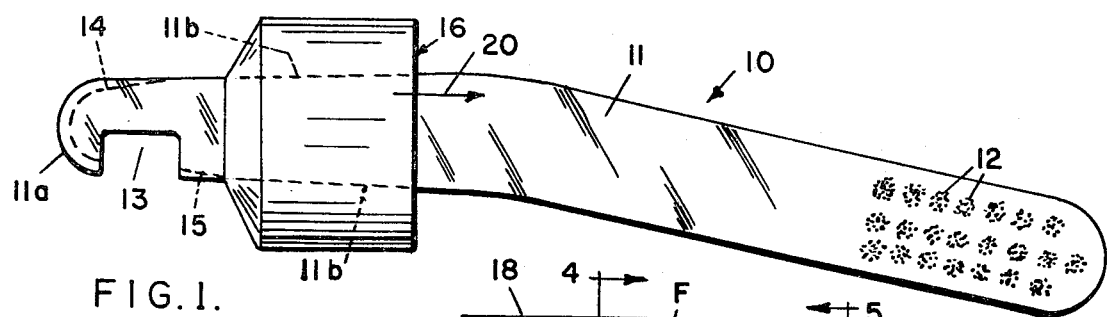
FIG. 1 is a side elevational view of the dental floss holder in accordance with the invention.

Referring now to the accompanying drawings in detail, the dental floss holder of the invention is designated generally by the reference character 10 in FIG. 1 and comprises an elongated handle 11 which, for all practical purposes and convenience, may be the handle of a toothbrush, with tufts of bristles 12 being provided on one end portion of the handle, as shown. However, if desired, the bristle head may be omitted and the handle 11 provided solely for purposes of the floss holder as such.

In any event, the handle 11 is of a rectangular cross-section and is longitudinally tapered in the direction of its end portion 11a, this taper being obtained by having the opposite side edges 11b of the handle mutually convergent. The other two flat sides 11c of the handle may be parallel.

Figure 2:
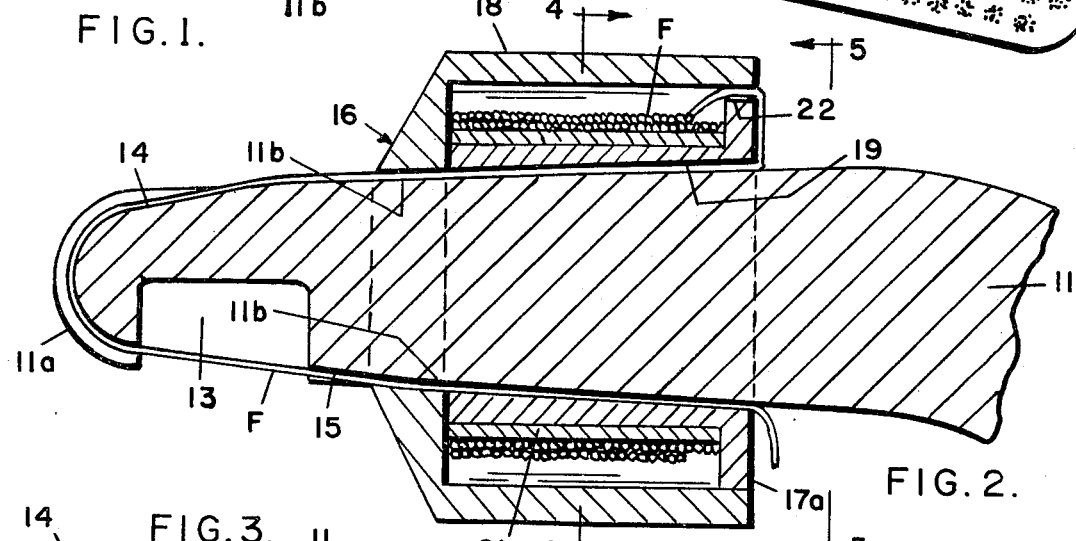
FIG. 2 is an enlarged, fragmentary longitudinal sectional view thereof.
Figure 3:
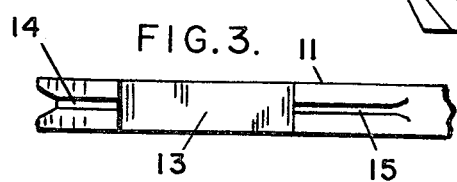
FIG. 3 is a fragmentary edge view of the tapered end portion of the handle.
Figure 4:
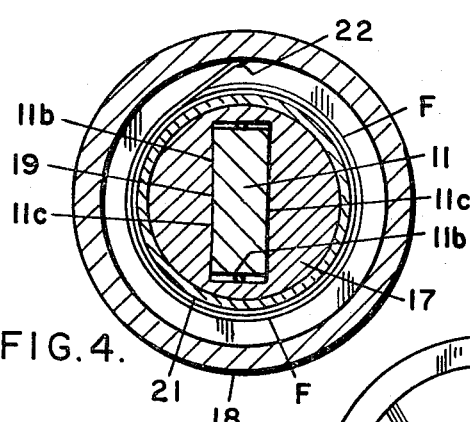
FIG. 4 is a cross-sectional view, taken substantially in the plane of the line 4—4 in FIG. 2.
Figure 5:
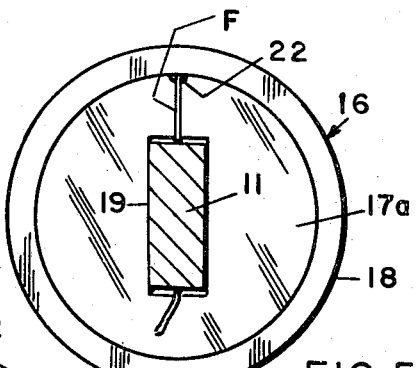
FIG. 5 is a cross-sectional view, taken substantially in the plane of the line 5—5 in FIG. 2.

The tapered end portion 11a of the handle is provided in one side thereof with an open recess 13, across which a length of dental floss F may be stretched, as will be apparent from FIG. 2. To prevent lateral displacement of the floss, grooves 14, 15 are formed along the handle end portion 11a at the opposite ends of the recess 13, the groove 14 extending around the rounded end of the handle, as shown.

A casing generally designated as 16 is slidably positioned on the handle 11, the casing including an inner core 17 which is surrounded by an outer shell 18. The core 17 is provided with a central open-ended bore 19 which is complemental to the cross-section of the handle 11 and, like the handle, is longitudinally tapered so that when the casing 16 as a whole is slid along the handle in the direciton of the arrow 20 in FIG. 1, it becomes wedgingly locked. However, in the other direction, the casing may be slid completely off the handle over the tapered handle end 11a.

Although the handle 17 has the rectangular bore 19, the outside of the core is cylindrical and one end thereof is provided with a flange 17a which is press-fitted into and constitutes a closure for the adjacent open end of the shell 18, as will be apparent from FIG. 2. A spool 21, which may be in the form of a simple tubular bushing, is rotatably positioned on the cylindrical outside of the core 17, the spool being disposed within the shell 18 inwardly of the flange 17a, and a supply of the floss F is wound on the spool. The floss extends outwardly through a notch 22 in the periphery of the flange 17a, and it will be understood that although the shell 18, the core 17 and the core flange 17a remain stationary with the handle 11, the floss F may be withdrawn from the inside of the shell while the spool 21 rotates on the core 17.

Figure 6:
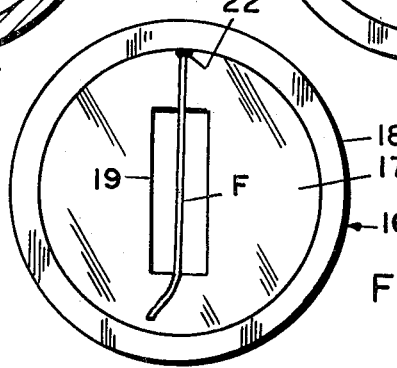
FIG. 6 is an end view of the casing, similar to FIG. 5, but with the handle removed.

In operation, the device is first disassembled for purposes of loading it with floss, this being effected by removing the entire casing 16 from the handle 11 and separating the core 17 from the shell 18 so that the spool 21, wound with floss, may be placed on the core 17. Then, with the floss extending outwardly through the notch 22 in the core flange 17a, the core is fress-fitted into the shell 18 and the floss F is extended over the bore 19 in the core 17, as illustrated in FIG. 6 which shows the entire casing 16 removed from the handle.

While the end of the floss is held against the flange of the core, the tapered end 11a of the handle 11 is then inserted through the bore 19, the floss becoming seated in the groove 14 in the end of the handle, and as the whole casing 16 is slid along the handle in the direction of the arrow 20, the floss becomes unwound from the spool 21 so that it extends first outwardly along the top edge of the handle through the bore 19 (as viewed in FIG. 2), then around the handle end 11a, across the recess 13, and then inwardly along the bottom edge of the handle through the bore 19. When the casing 16 ultimately reaches its aforementioned wedgingly locked position on the handle, the two stretches of floss in the bore 19 become wedged between the top and bottom walls of the bore 19 and the edges 11b of the handle. In this simple manner the implement is quickly and easily fitted with floss and the floss is automatically stretched across the recess 13 in readiness for use.

When after some use a fresh stretch of floss is to be provided across the recess 13, the entire casing 16 is simply slid to some extent along the handle in the direction of the end 11a so that it becomes unlocked from its wedging action with the handle while still remaining in position thereon. The free end of the floss may then be pulled through a desired distance to place a fresh stretch thereof across the recess 13, while the spool 21 rotates inside the casing 16 during the floss pulling procedure. After that, the casing 16 is slid back to its locked position to hold the floss in its tightly stretched condition.

While in the foregoing there has been described and shown the preferred embodiment of the invention, various modifications and equivalents may be resorted to within the spirit and scope of the invention as claimed.

What is claimed is:

1. A dental floss holder comprising in combination, an elongated and longitudinally tapered handle provided in its tapered end portion with an open recess across which a length of floss may be stretched, a casing slidably positioned on said handle and provided with an open-ended tapered bore through which the handle extends so that the casing may become wedged on the handle when slid thereon in one direction to a locked position, and a supply of floss contained in said casing and extending first in one direction through said bore, then across said recess in said handle, and then in the other direction through the bore, whereby portions of the floss in the bore may be wedgingly locked against the handle when the casing is slid to its locked position.

2. The device as defined in claim 1 wherein said casing includes an inner core provided with said bore for said handle, and an outer shell having said inner core removably positioned therein.

3. The device as defined in claim 1 together with a spool rotatably positioned in said casing and carrying said supply of floss.

4. The device as defined in claim 1 wherein said casing includes an inner core provided with said bore for said handle, and an outer shell having said inner core removably positioned therein, together with a spool rotatably positioned on said core within said shell and carrying said supply of floss.

5. The device as defined in claim 1 which is further characterized in that said handle and said bore in said casing are of a complemental rectangular cross-section with pairs of opposite tapered walls between which portions of floss in the bore are wedgingly lockable.

6. The device as defined in claim 1 wherein the tapered end portion of said handle at the opposite ends of said recess is provided with floss receiving grooves.

7. The device as defined in claim 1 which is further characterized in that said casing is slid to its locked position in a direction away from the tapered end of said handle, and that sliding of the casing toward the tapered end unlocks the portions of floss wedged in said bore, whereby an additional length of floss may be drawn from the supply in said casing.

References Cited

UNITED STATES PATENTS

| | | | |
|---|---|---|---|
| 1,184,052 | 5/1916 | Turner et al. | 132—92 R |
| 3,472,247 | 10/1969 | Borson et al. | 132—91 |

ROBERT PESHOCK, Primary Examiner